Patented Oct. 24, 1944

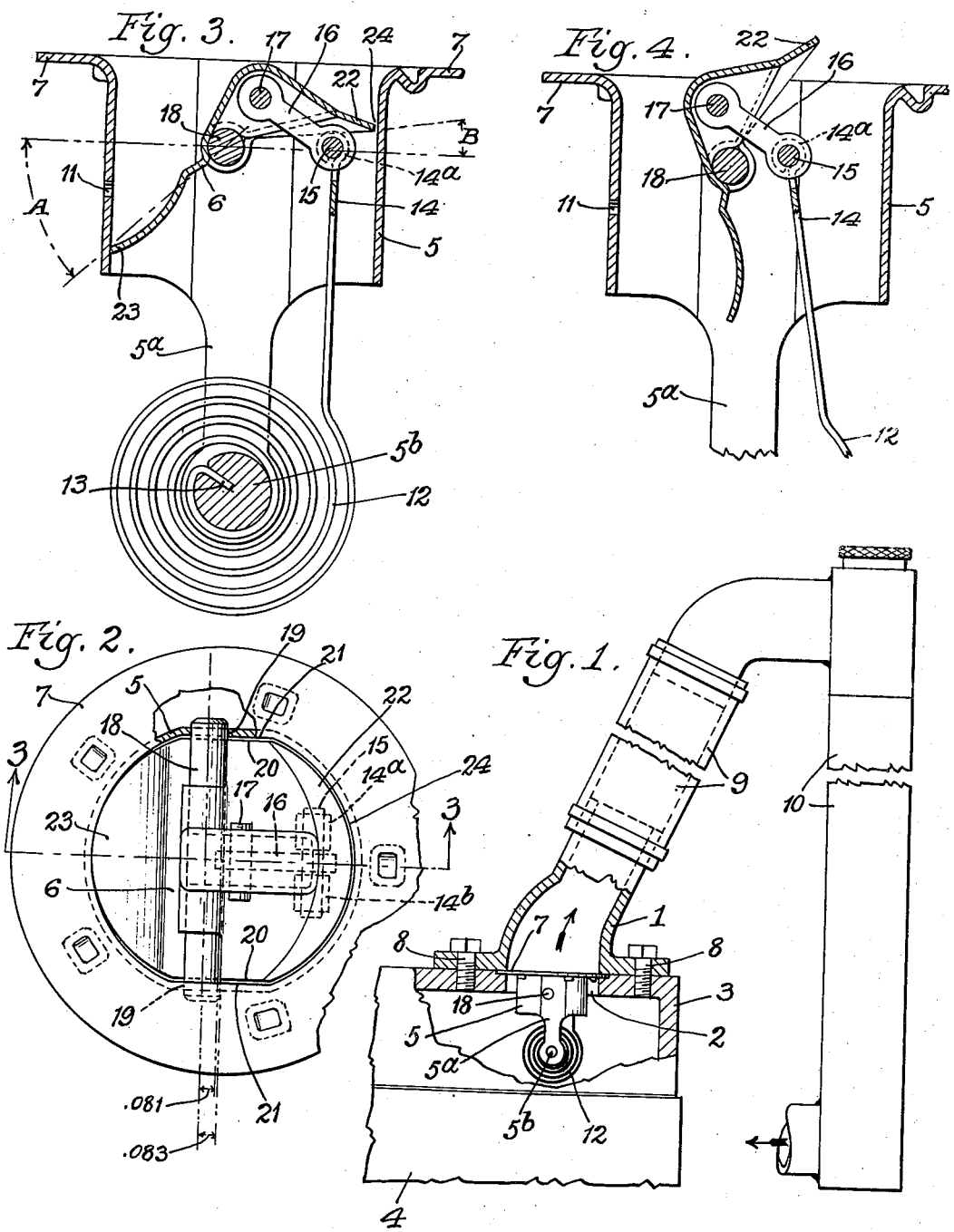

2,361,006

UNITED STATES PATENT OFFICE 2,361,006

THERMOSTATIC VALVE DEVICE

Clyde A. Brown, Chicago, Ill., assignor to The Dole Valve Company, Chicago, Ill., a corporation of Illinois Application December 19, 1941, Serial No. 423,662

4 Claims. (Cl. 236—34)

This invention relates to improvements in thermostatic valve devices and has for its object to provide a new and improved device of this description.

The invention is particularly adapted for uses wherein the valve is actuated by a thermostat.

The thermostats which are customarily used for actuating valves have a limited amount of power which can be exercised in opening or closing such valves. The present invention has as one of its objects to provide a valve which utilizes the power of the thermostat in a maximum manner.

The invention has as a further object to provide a valve actuated by a thermostat arranged so that the resistance to the movement of the valve, by friction or otherwise, is reduced to a minimum.

The invention has as a further object to provide a thermostatic valve device where the valve is used to close a pipe, the valve arranged so that its frictional contact with the pipe is greatly reduced.

The invention has as a further object to provide a thermostatic valve device where there is a clearance between the toe of the valve and the conduit which it controls.

The invention has as a further object to provide a thermostatic valve device of the butterfly type wherein the shaft of the valve is offset a small amount and the holes in the conduit controlled by the valve is offset a small amount, and where the edges of the valve on each side of the shaft are substantially flat instead of curved.

The invention has other objects which are more particularly pointed out in the accompanying description.

Referring now to the drawing, wherein I have shown one form of device embodying the invention:

Fig. 1 is a view, with parts broken away, showing the invention as applied to the circulatory cooling system of an internal combustion engine;

Fig. 2 is a top view of the thermostatic valve and casing with parts broken away;

Fig. 3 is a sectional view taken on line 3—3 of Fig. 2, showing the valve in its closed position;

Fig. 4 is a view similar to Fig. 3, showing the valve in its open position.

Like numerals refer to like parts throughout the several figures.

In the construction shown, there is a fitting 1 mounted over the opening 2 in the water jacket 3 of the internal combustion engine 4. There is a casing 5 for the valve 6 which has a flange 7 clamped between the fitting 1 and the water jacket 3 by means of the bolts 8. Fitting 1 is connected by a pipe 9 with the radiator 10. There is a bleed hole 11 in the casing. The casing 5 has the projections 5a which support a shaft 5b.

A thermostat comprising a bimetallic coil 12 has one end 13 connected with the shaft 5b, the other end 14 is connected with a pin 15 on a link 16 pivotally connected by the pivot 17 with the valve 6. The end 14 of the thermostat is preferably bifurcated, the separate ends being on opposite sides of the link 16 and having loops 14a and 14b which loop over the pin 15 (see Fig. 2). The valve 6 is mounted upon a shaft 18 extending across the casing 5.

Some means is provided for reducing the resistance of the valve 6 to the power of the thermostat in moving it to its open and closed positions. As herein shown, the valve 6, at the points where the shaft 18 projects therefrom, is provided with the substantially flat edges 20 and the casing at these same points, that is in proximity to the shaft 18, is provided with the substantially flat faces 21, the arrangement being such that these opposed flat faces do not have frictional contact as the valve is opened and closed.

Some means is also provided for preventing the toe 22 of the valve from engaging the casing when the valve is closed. This result is secured in the present instance by the following construction:

The shaft 18 is offset or eccentric with relation to the valve 6 and extends into holes 19 in the casing 5. These holes are offset or eccentric with relation to the casing. By means of this offset or eccentric construction the heel 23 of the valve strikes the casing and maintains the toe 22 a short distance from the casing when the valve is closed, leaving a space 24 between the toe of the valve and the casing (see Figs. 2 and 3).

It will, therefore, be seen that by this construction the toe of the butterfly valve does not rub the casing in the closing or opening movement or at any other time, and that the flat portions of the butterfly valve in proximity to the shaft does not engage the casing so as to bind thereon and produce resistance to the opening and closing of the valve. I have found that when this butterfly valve rubs the body at the toe or binds on the flat portions in proximity to the shaft when in its closed position, the performance and action of the valve is injuriously affected and will cause the motor temperature to run hot at high speed and cold at low speeds under winter driving conditions. I have found that the fit of the butterfly valve in the body and the result of clearance conditions herein set out definitely determine whether or not the thermostat will provide good control.

It is, of course, evident that any suitable method may be used for securing this proper clearance. I have found, for example, that by having the shaft of the butterfly valve offset .081 and the holes for the shaft in the casing offset .083, good performance of the device is assured. This automatically throws the butterfly valve .003 inch off center with respect to the eccentricity of the valve shaft. The diameter of the butterfly valve is made appreciably smaller than the inside diameter of the casing so that it can contact at only one portion of the casing when closed. This additional eccentricity of the butterfly shaft is provided to bring this portion of the contact at the heel 23 of the valve only. This contact extends through an arc of substantially 90 degrees, that is, it is made within an arc of substantially 90 degrees.

The toe of the valve is out of contact with the casing. These features are shown in Fig. 2. In this construction, it will be noted, as shown in Fig. 3, that the angle between the horizontal line passing through the pivot 18 and the heel of the valve when the valve is closed, as indicated at A, is considerably greater than the angle of this line with the toe of the valve as indicated at B.

Under these conditions, as the toe engages the casing, the frictional effect in resisting the opening of the valve is greatly increased because since the angle between the arc of travel of the toe and the side of the casing is much smaller than the similar angle of the heel when the valve is closed, any contact between the toe and the casing near the closing point is exaggerated and is effective throughout a greater arc of the movement than is the case with the heel.

When an ordinary butterfly valve has been used for a considerable time an ellipsoidal groove is worn in the shaft which interferes with the proper free movement of the valve, but with applicant's construction with the flat sides of the casing and the flat edges of the valve, any groove worn in the shaft would be worn at right angles to the shaft and this groove does not interfere with the free operation of the valve.

I claim:

1. A thermostatic valve device comprising a casing, an elliptical valve therein, a shaft connected with said valve, said shaft being offset with relation to the central portion of the valve, said valve having heel and toe portions, the outer marginal extremities of said portions being proportionally spaced with respect to the axis of rotation of said shaft so that upon partial rotation of the shaft said heel portion extremity will engage said casing while said toe portion is still spaced a small distance therefrom, holes in said casing for said shaft, said holes being offset with relation to the axis of said casing, said valve having flat edges at the point where the shaft is located, and the casing having flat faces at the portions where the holes for the shaft pass therethrough and which extend the length of the casing, the flat edges of the valve and the flat faces of the casing being opposite each other, projections on said casing in alignment with said flat faces, and a thermostat connected with said projections and said valve to control its position responsive to variations in temperature.

2. A thermostatic valve device comprising a casing, an elliptical valve therein having heel and toe portions, a shaft connected with said valve and disposed adjacent an intermediate portion of one surface of said valve, openings in said casing for said shaft, a bimetal coiled thermostat having one end connected to a part on the casing and the other end connected to said valve the heel of said valve being curved in a transverse plane of said valve, which plane is taken at substantially right angles to said shaft and being positioned with respect to the axis of rotation of said shaft so as to engage the casing while the toe is still out of engagement therewith so as to provide a space between the toe and the casing when the valve is closed to reduce the frictional resistance to the movement of the valve.

3. A thermostatic valve device comprising a tubular casing having a pair of opposed flat sides, a butterfly valve having heel and toe portions and having straight edges opposite the flat sides of said casing, a shaft in the plane of said valve and connected with said valve and with said casing so as to pivotally mount the valve in the casing, said shaft being disposed substantially at right angles to the flat sides of said casing, the outer marginal extremities of said portions being proportionally spaced with respect to the axis of rotation of said shaft so that upon partial rotation of the shaft said heel portion extremity will engage said casing while said toe portion is still spaced a small distance therefrom, the straight edges of the valve and the flat sides of the casing being in proximity but slightly spaced from each other, whereby when said valve is subjected to a fluid under pressure a fluid film is automatically maintained between said straight edges of said valve and said casing.

4. A thermostatic valve device comprising a generally tubular casing, a butterfly type valve having heel and toe portions, a shaft connected with said valve and with said casing so as to pivotally mount the valve in the casing, said valve being shaped so that the plane of the marginal extremity of said heel portion and said shaft is disposed at a greater angle from a plane passing through said shaft at right angles to the longitudinal axis of said casing than is the plane of the marginal extremity of said toe portion and said shaft, said marginal extremity of said heel portion being also positioned so as to engage the wall of said casing while said toe portion is still spaced a slight distance therefrom.

CLYDE A. BROWN.